United States Patent [19]

Rouge

[11] 4,338,384

[45] Jul. 6, 1982

[54] BATTERY ACTIVATED BY SEA WATER

[75] Inventor: Jean Rouge, Paris, France

[73] Assignee: Thomson-CSF, Paris, France

[21] Appl. No.: 204,053

[22] Filed: Nov. 4, 1980

[30] Foreign Application Priority Data

Nov. 5, 1979 [FR] France ................................ 79 27221

[51] Int. Cl.$^3$ ............................................. H01M 6/34
[52] U.S. Cl. ................................................... 429/119
[58] Field of Search ......................................... 429/119

[56] References Cited

U.S. PATENT DOCUMENTS

| 3,177,099 | 4/1965 | Kirk et al. | 429/119 |
| 3,437,529 | 4/1969 | Honer | 429/119 |
| 3,811,945 | 5/1974 | De Rossi | 429/105 |

FOREIGN PATENT DOCUMENTS

| 1450294 | 8/1966 | France . | |
| 2053489 | 4/1971 | France . | |
| 2126395 | 10/1972 | France . | |
| 2210831 | 7/1974 | France . | |
| 2333357 | 6/1977 | France . | |
| 1239526 | 7/1971 | United Kingdom | 429/119 |

Primary Examiner—Donald L. Walton
Attorney, Agent, or Firm—Oblon, Fisher, Spivak, McClelland & Maier

[57] ABSTRACT

Batteries activated by immersion in the sea comprise a case containing battery elements separated by tightly sealed partitions. These elements are electrically connected in series.

Tubes leading to the elements are used for filling and for discharging gases. These tubes are connected to first connecting tubes, coaxial to second connecting tubes issuing to the outside by means of openings.

Application to long-life batteries for sonic buoys which can be dropped from an aircraft.

8 Claims, 5 Drawing Figures

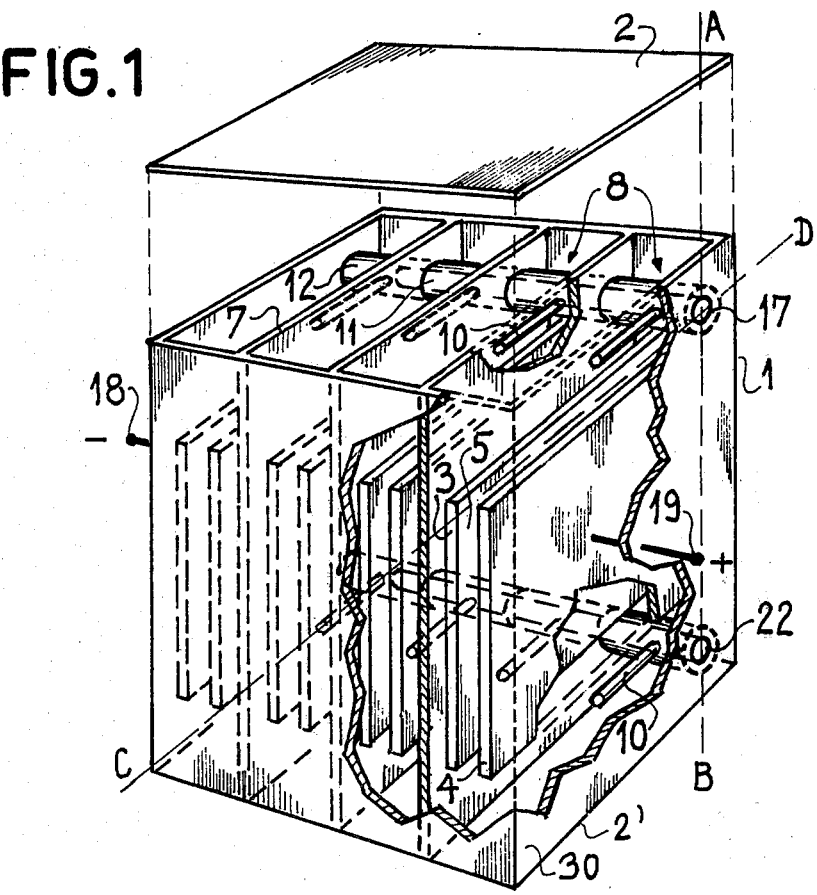
FIG.1
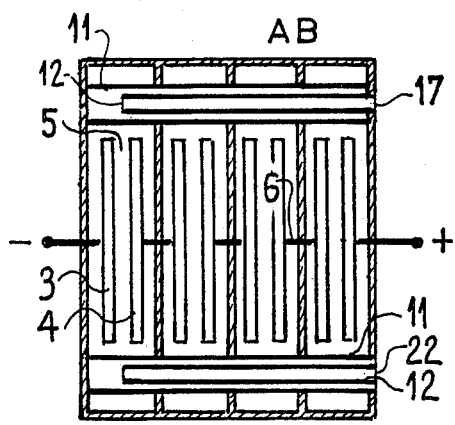
FIG.2-a
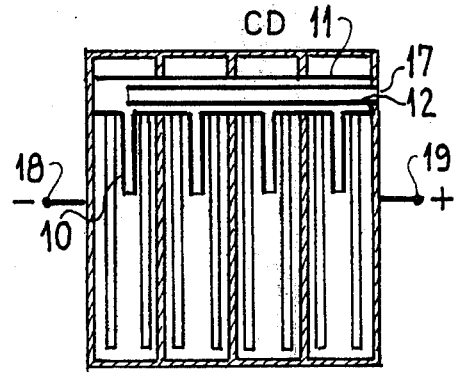
FIG.2-b

BATTERY ACTIVATED BY SEA WATER

BACKGROUND OF THE INVENTION

The present invention relates to batteries which can be energized and activated by sea water and more particularly batteries for equipping radio-sonic buoys used for hydrolocation purposes.

Normally such batteries have elements located in an insulating case containing the openings necessary for the inflow of water and the giving off of gas. It is known that each element is constituted by two electrodes, called the anode and the cathode. The elements are electrically connected in series in such a way that the anode of one element is connected to the cathode of the adjacent element.

On putting into service by immersion the electrolyte, generally sea water, passes between the electrodes by means of outwardly directed openings provided level with each element, Thus, in the surrounding conductive electrolyte an electrical path is created between the electrodes of one random element and the electrodes of each of the other elements. As the electrodes are at different potentials to one another electrical leakage currents occur between any random one of the electrodes and each of the other electrodes.

U.S. Pat. No. 3,394,034, published on July 23, 1968 describes batteries which can be energized by sea water. Each element has a plug or cap making it possible to seal the element when the plug or cap is closed. The latter can be opened for brief periods during the operation of the battery to permit the introduction of the electrolyte, its replacement and the removal of gas given off.

Although these batteries have an increased service life, they have the disadvantage of using relatively complex devices which are not really compatible with the requirements of mass production at minimum cost.

There are other simpler batteries for which the openings made in the case cannot be closed. The electrolye is allowed to freely circulate between the elements and between the interior of the battery and the exterior. The electrical leakage currents between the elements passing via the electrolyte are then generally high and give rise to accelerated wear of the electrodes, reducing the service life of the pile.

To compensate this wear it is indispensible to increase the quantity of metal forming the electrodes to have an acceptable life. This is a disadvantage, because the metals used for the electrodes are costly, which increases the cost of the equipment.

BRIEF SUMMARY OF THE INVENTION

The battery according to the invention obviates these disadvantages by making it possible to obtain simply manufactured batteries with electrodes containing less metal than batteries with non-closable openings.

The present invention therefore relates to a battery activated by immersion in sea water and constituted by a number of elements, each element comprising two electrodes separated be tightly sealed partitions, wherein it comprises a first network of tubes for the sea water filling and a second network of tubes for discharging gases given off and wherein each element is connected with one end of a tube of the filling network and with the end of the tube of the gas discharge network, the other ends of the tubes being connected to means which issue to the outside of the battery.

BRIEF DESCRIPTION OF THE DRAWINGS

The invention is described in greater detail hereinafter relative to non-limitative embodiments and the attached drawings, wherein show:

FIG. 1 a general perspective view of the battery according to the invention.

FIGS. 2a and 2b two sectional views of the battery.

DETAILED DESCRIPTION OF THE PREFERRED EMBODIMENTS

Figure 3:
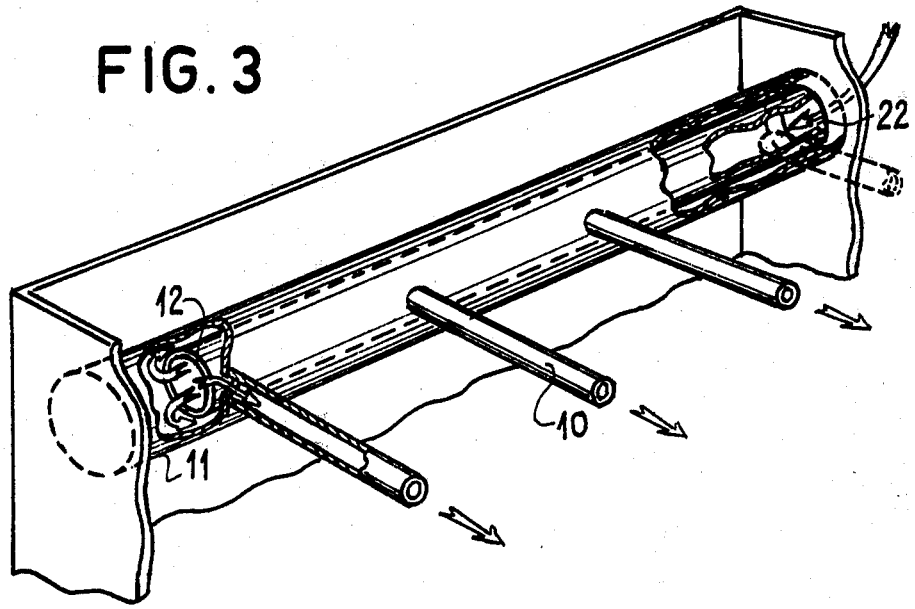
FIG. 3 a more detailed view of tubes showing the circulation of sea water in the battery.

The battery according to the invention is diagramatically shown in FIG. 1, whilst FIG. 2a shows it in section along AB and FIG. 2b in section along CD. The battery comprises a plurality of elements 8 placed within a case 1, separated by tight partition 7 and electrically connected in series. Each element comprises two plates forming electrodes, namely anode 3 and cathode 4, leaving between them a space 5 necessary for the introduction of the electrolyte. A tightly sealed passage 6 is made in partition 7 between each element for establishing the electrical connection between the cathode of one element and the anode of the adjacent element.

The battery is used, for example, on a system to be submerged in the sea, such as an ultrasonic radio buoy which can be dropped from an aircraft. When the system is operating normally the battery is located in the position for which the plate 2 defines the top of the battery, whilst plate 2' defines the bottom. The battery is activated when all the elements 8 are filled with the electrolyte, i.e. sea water. According to the invention the battery has electrolyte distribution arrangements making it possible to reduce the electrical leakage currents.

The battery has at least two outwardly directed openings 17 and 22, located respectively at the top and the bottom. A same network of tubes corresponds to each opening. Each network is formed by two coaxial tubes 11 and 12, whose axis is perpendicular to the partition 7 and a series of tubes 10 connected perpendicularly to tube 11, their end issuing level with each element in such a way that the number of tubes 10 is equal to the number of elements in the battery.

One end of tube 12 constitutes the only outwardly direct opening, whilst the other end issues into the tube 11.

When the battery is submerged, the sea water enters mainly via the bottom opening 22, where the hydrostatic pressure is higher than at the top opening 17 and by which the air is expelled.

As is diagramatically indicated in FIG. 3 the path followed by the sea water towards the inside of the battery is constituted by tube 12, then by the gap between tube 12 and tube 11 and by the tubes 10. At the end of filling the two networks of tubes are filled with sea water and, during operation, gases which are given off are discharged by the upper opening 17.

The filling level is dependent on the capillary pressure and the hydrostatic pressure. The capillary pressure is inversely proportional to the radius of tube 10 with the smallest dimensions. In addition, the lower the capillary pressure P of the tube compared with the hydrostatic pressure difference between the two openings 17 and 22 the higher the filling level of the battery. Moreover the larger the cross-section of the tubes the smaller the filling time.

It is also known that for a conductive tube of length l and a section s the electrical resistance R is equal to R=l/ks in which k is the conductivity. In the same way the filling time is also proportional to l/s.

An increase in the electrical resistance R implies an increase in the tube length l and a reduction in the cross-section s. However, if the cross-section is reduced too much the filling time and the capillary pressure P would be increased, which would limit the filling level.

For the battery according to the invention the tubes 10 of the two networks have cross-sections selected so as to obtain on the one hand a filling time which is compatible with the desired operating conditions, e.g. approximately 1 minute, and on the other hand a filling level up to the complete immersion of the plates. Furthermore the lengths of these tubes are selected as a function of the cross-section to obtain electrical resistance values which are sufficiently high to limit the leakage currents.

Such an optimization of the paramaters' filling level, filling time and leakage resistances was not possible with the prior art batteries having one filling hole and one hole for discharging the gases in faces 2 and 2' for each element.

Figure 4:
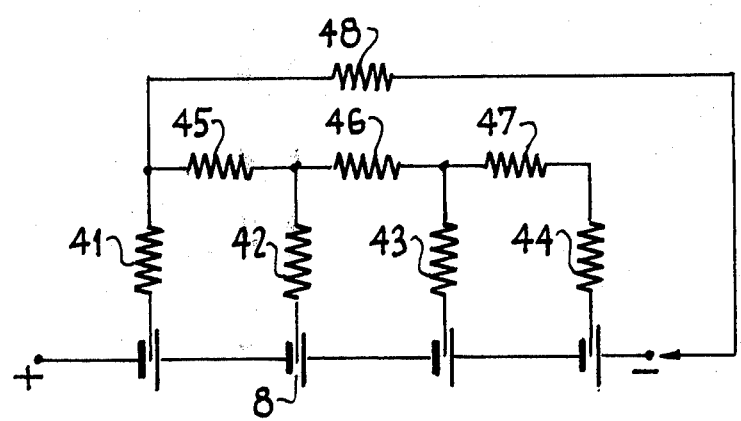
FIG. 4 an equivalent circuit diagram of the leakage resistors of the battery.

FIG. 4 shows the circuit diagram equivalent to a distribution network. Resistors 41, 42, 43 and 44 are formed by tubes 10, whilst resistors 45, 46, 47, which are not equal, are formed by the annular space between tubes 11 and 12. If one of the terminals of the battery is connected to sea water via the apparatus frame, e.g. the negative terminal, resistor 48 formed by tube 12 makes it possible to reduce the leakage currents between this terminal, which is at the potential of the sea water, and each of the elements of the battery. Advantageously openings 17 and 22 can be located on the face corresponding to the terminal having the highest potential compared with sea water. The path within tube 12 and then tube 11 between the outer opening and the tube 10 of the element at the highest potential is consequently at a maximum level. Moreover the increase in the electrical resistance between the sea water and an element increases in proportion to the potential of said element.

Batteries are frequently used, whose anode is constituted by magnesium and whose cathode is constituted by silver chloride. This electrochemical pair being very effective in a battery activated by sea water.

Silver chloride is an expensive material and the limitation of the leakage currents obtained according to the invention makes it possible to reduce the amount of silver chloride by approximately 50% compared with non-closable batteries, whilst retaining identical performance levels under the same conditions of use.

For example a 12 volt battery of this type has been produced having eight 1.5 volt elements and in which the tubes have a circular cross-section. Tubes such as 10 have a diameter of approximately 3 mm and a length of approximately 30 mm. The length and diameter of a tube 11 are respectively approximately 55 mm and 8 mm, whilst they are approximately 32 and 4 mm in the case of a tube 12.

After being immersed in sea water it takes approximately 1 minute to completely fill this battery.

According to a variant of the invention the described device is simplified by eliminating tubes 11 and 12 and by having the tubes 10 issue directly to the outside or by illuminating tube 12, tube 11 issuing directly to the outside.

According to another variant of the invention the two tubes 11 are placed in the vicinity of the two opposite lateral faces of the battery, tubes 10 of each network being oppositely oriented, e.g. opening 22 would be located in corner 30 in FIG. 1.

What is claimed is:

1. A battery activated by immersion in sea water and constituted by a number of cells, each cell comprising two electrodes separated by tightly sealed partitions, comprising a first network of tubes for filling with sea water and a second network of tubes for discharging gases given off, wherein said first network and said second network each comprise a connecting tube which passes through said tightly sealed partition separating said cells, with one end of said connecting tubes communicating with the outside of the battery, said first and second networks each further comprising a series of tubes connected perpendicular to said connecting tube, one tube of each of said series ending in one of said cells.

2. A battery according to claim 1, wherein each of said connecting tubes is composed of two coaxial tubes, the end of one tube being directly connected to the outside, while the other tube is connected to said series of perpendicular tubes.

3. A battery according to claim 1, wherein said connecting tubes issue directly to the outside.

4. A battery according to claim 1, wherein the means for connecting said two networks of tubes to the outside are direct openings made in the lateral faces of the battery for each of said connecting tubes.

5. A battery according to claim 1, wherein one of the terminals forming the pole for the connecting in series of the elements of the battery is brought into electrical contact with the sea water from the outside.

6. A battery according to claim 5, wherein the means making it possible to connect the two networks of tubes with the outside are such that the externally directed openings are positioned on the same face of the battery as the terminal in contact with the sea water.

7. A battery activated by immersion in sea water and constituted by a number of elements, each element comprising two electrodes separated by tightly sealed partitions, wherein it comprises a first network of tubes for the sea water filling and a second network of tubes for discharging gases given off and wherein each elemwent is connected with one end of a tube of the filling network and with the end of the tube of the gas discharge network, the other ends of the tubes being connected to means which issue to the outside of the battery, wherein the means for connecting the filling tubes and the tubes for discharging gases to the outside comprise for each of these networks of tubes a connecting tube which passes through the tightly sealed partition separating the elements and wherein the connecting tubes are connected perpendicular to the tubes of the two networks, and wherein a second connecting tube is placed coaxially within each first connecting tube and one end of the second connecting tube is directly connected to the outside, whilst the other end is connected to the first connecting tube.

8. A battery according to claim 7, wherein the second connecting tubes for the discharge of the gases issue to the outside on the face opposite that on the side of the terminal connected to the sea water.

* * * * *